US012670481B2

(12) United States Patent
Brightman et al.

(10) Patent No.: US 12,670,481 B2
(45) Date of Patent: Jun. 30, 2026

(54) DYNAMICALLY LINKING MACHINE-READABLE CODES TO DIGITAL ACCOUNTS FOR LOADING OF APPLICATION DATA

(71) Applicant: PayPal, Inc., San Jose, CA (US)

(72) Inventors: Jason Brightman, Oakland, CA (US); Alexander C. Simonson, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/229,911

(22) Filed: Aug. 3, 2023

(65) Prior Publication Data

US 2024/0029050 A1    Jan. 25, 2024

Related U.S. Application Data

(63) Continuation of application No. 16/917,794, filed on Jun. 30, 2020, now Pat. No. 11,756,025.

(51) Int. Cl.
| | |
|---|---|
| *G06Q 20/32* | (2012.01) |
| *G06Q 10/40* | (2026.01) |
| *G06Q 20/04* | (2012.01) |
| *G06Q 20/10* | (2012.01) |
| *G06Q 20/22* | (2012.01) |

(Continued)

(52) U.S. Cl.
CPC ......... *G06Q 20/3276* (2013.01); *G06Q 10/40* (2026.01); *G06Q 20/047* (2020.05); *G06Q 20/108* (2013.01); *G06Q 20/223* (2013.01); *G06Q 20/3221* (2013.01); *G06Q 20/326*

(2020.05); *G06Q 20/346* (2013.01); *G06Q 20/3674* (2013.01); *G06Q 20/384* (2020.05); *G06Q 20/4037* (2013.01); *G06Q 20/409* (2013.01); *G06Q 20/42* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 2014/0222545 A1 | 8/2014 | Hajji | |
| 2015/0294437 A1* | 10/2015 | Manno | ................. G06Q 20/409 |
| | | | 382/182 |

(Continued)

*Primary Examiner* — Matthew S Gart
(74) *Attorney, Agent, or Firm* — Haynes and Boone, LLP

(57) ABSTRACT

There are provided systems and methods for dynamically linking machine-readable codes to digital accounts for loading of application data. A user may engage in a transaction with another user, such as a purchase of goods, services, or other items a merchant using a physical payment card. A machine-readable code may be provided on the payment card, where the machine-readable code may be dynamically linked to underlying data with an online transaction processor. The user may provide the payment card to another user that may capture the machine-readable code on the payment card. The other user's device may then utilize the machine-readable code with the online transaction processor to perform an account lookup using database information dynamically linked to the machine-readable code. Thereafter, the other user's device may automatically load account data for the account without having the user enter the account's identifier.

20 Claims, 5 Drawing Sheets

100

(51) Int. Cl.
| | |
|---|---|
| *G06Q 20/34* | (2012.01) |
| *G06Q 20/36* | (2012.01) |
| *G06Q 20/38* | (2012.01) |
| *G06Q 20/40* | (2012.01) |
| *G06Q 20/42* | (2012.01) |
| *G06Q 40/02* | (2023.01) |

(56)             References Cited

U.S. PATENT DOCUMENTS

| | | | |
|---|---|---|---|
| 2020/0175495 | A1 | 6/2020 | Omojola et al. |
| 2021/0110400 | A1 | 4/2021 | Lee |
| 2021/0350446 | A1 | 11/2021 | D'Haenens et al. |

* cited by examiner

400

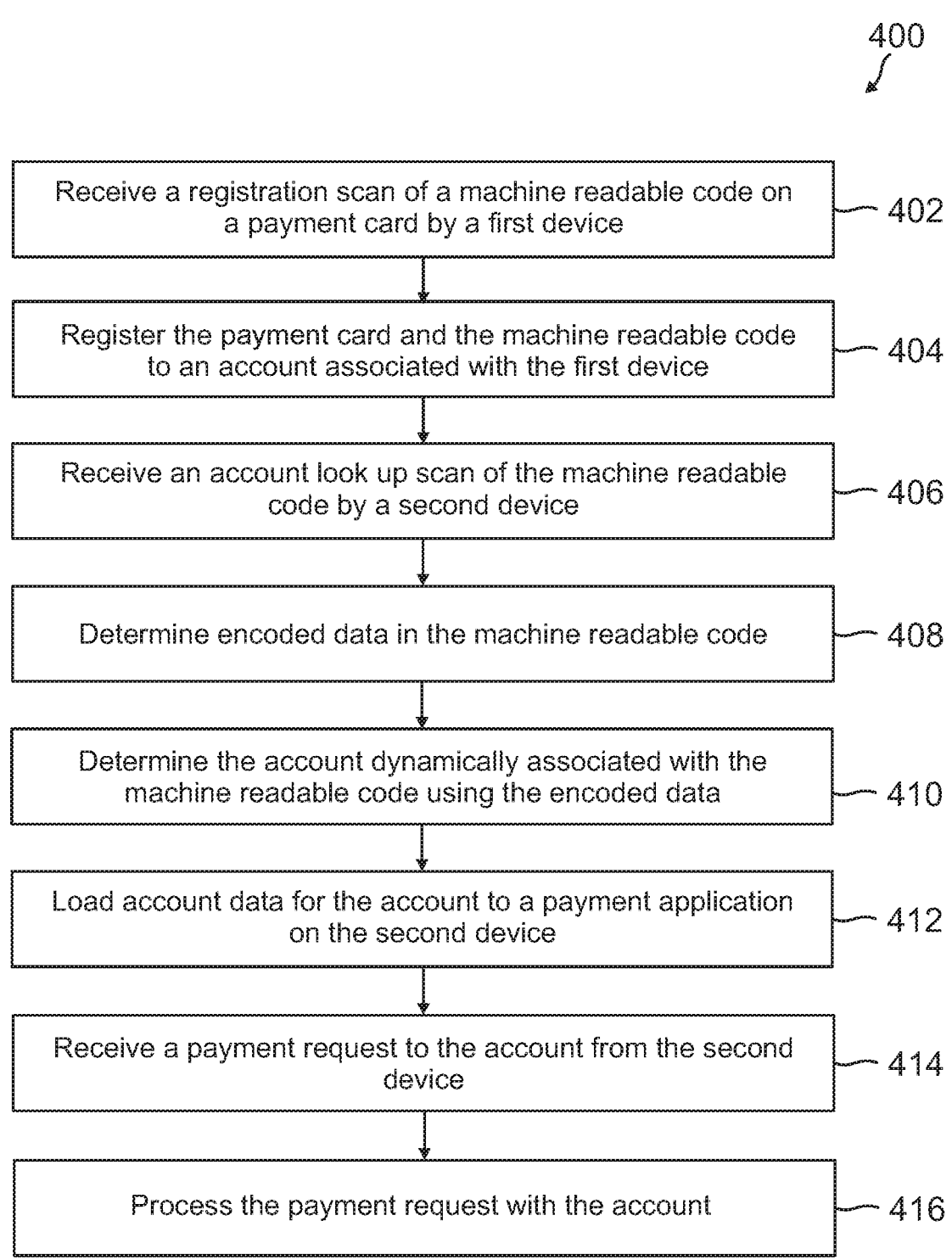

Receive a registration scan of a machine readable code on a payment card by a first device — 402

Register the payment card and the machine readable code to an account associated with the first device — 404

Receive an account look up scan of the machine readable code by a second device — 406

Determine encoded data in the machine readable code — 408

Determine the account dynamically associated with the machine readable code using the encoded data — 410

Load account data for the account to a payment application on the second device — 412

Receive a payment request to the account from the second device — 414

Process the payment request with the account — 416

FIG. 4

DYNAMICALLY LINKING MACHINE-READABLE CODES TO DIGITAL ACCOUNTS FOR LOADING OF APPLICATION DATA

CROSS REFERENCE RELATED APPLICATIONS

The present application is a continuation of U.S. patent application Ser. No. 16/917,794, filed Jun. 30, 2020, which is incorporated in its entirety.

TECHNICAL FIELD

The present application generally relates to utilizing machine-readable codes and more particularly to dynamically linking backend data with an online service provider to quick response (QR) codes on physical objects to facilitate loading of application data.

BACKGROUND

Users may utilize online transaction processors for processing payments between different entities through device applications and digital accounts. Further, these online transaction processors or other service providers may also provide physical payment cards for in-person transaction processing and use at merchant locations. When two or more users conduct a transaction together, such as by purchasing a meal together, the online transaction processor may be utilized to process payments between the users in order to provide reimbursements and/or split electronic transaction processing. However, when utilizing a mobile application between devices, the mobile application may require multiple inputs to navigate to particular interfaces and locate other digital accounts and users on the application's platform. For example, a peer-to-peer networking platform of the online service provider may have many identifiers and usernames, which may be similar, and may lead to mistakes in locating proper users. This involves time consuming processes when providing user input and properly navigating the interface of the application. Thus, the mobile applications of the online service providers may cause unnecessary inputs and data processing steps.

BRIEF DESCRIPTION OF THE DRAWINGS

FIG. 4 is a flowchart of an exemplary process for dynamically linking machine-readable codes to digital accounts for loading of application data, according to an embodiment.

Figure 1:
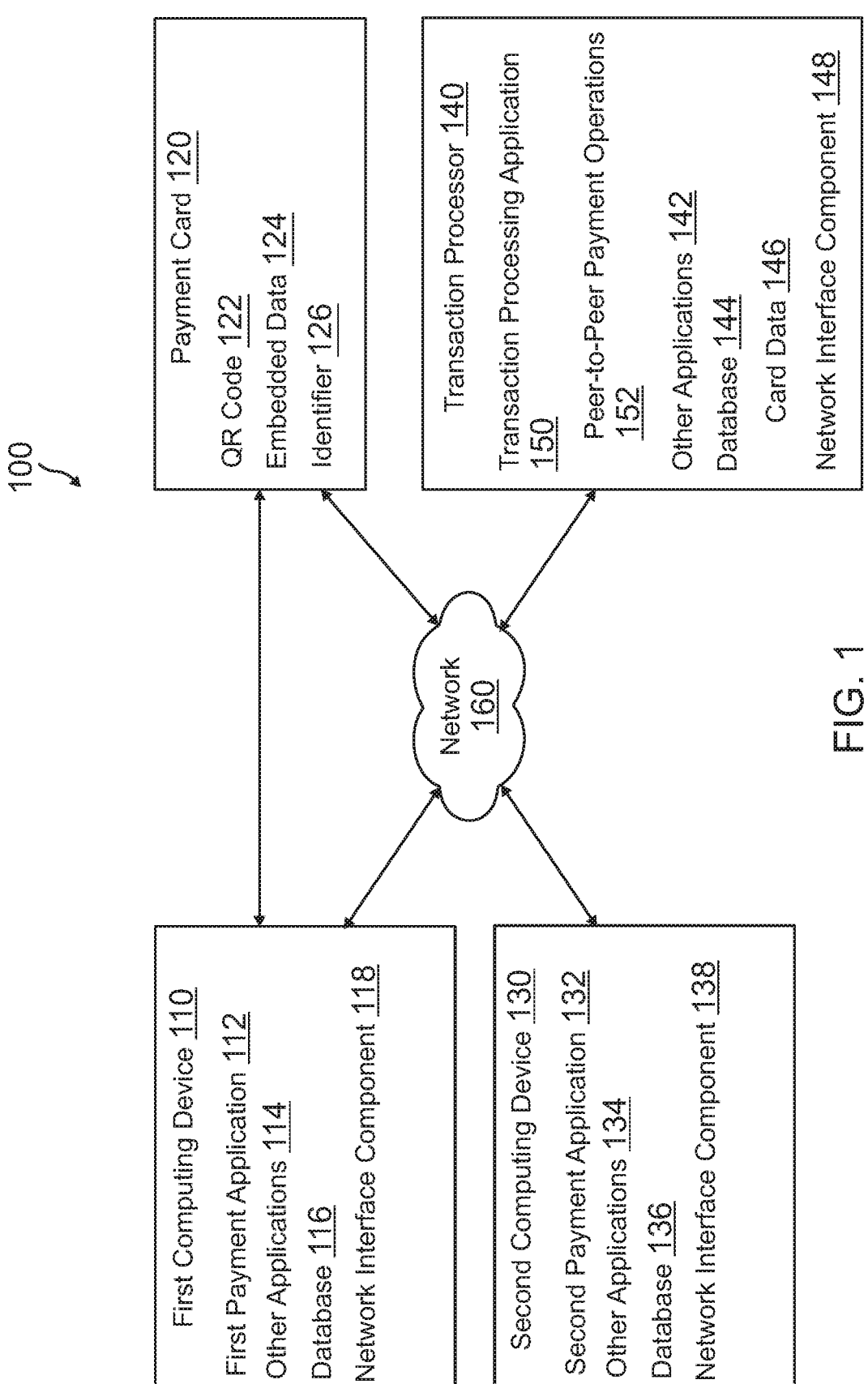
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for dynamically linking machine-readable codes to digital accounts for loading of application data. Systems suitable for practicing methods of the present disclosure are also provided.

A user may utilize a payment card to process payments through an electronic card or transaction network associated with a backend payment processor or other entity on the network. This payment card may be linked to a digital account of the user with an online transaction processor or other service provider, such as a payment service provider (e.g., PayPal®, Venmo®, etc.), which may provide electronic transaction processing services to users through the account and one or more websites and/or applications of the online transaction processor or a merchant. The online transaction processor may provide the payment card as a physical card, such as one with credit/debit card dimensions (e.g., ~85.x54 mm (3.37×2.125 in)) or another sized card, that includes data encoded to a machine-readable code (e.g., quick response (QR) code, barcode, visual code, etc.) embedded or designed onto a surface of the card. The card may further include one or more storage mediums (e.g., magnetic stripe, EMV or other payment chip, RFID chip, NFC chip, or the like) that may store card data necessary to perform electronic transaction processing with a card processing network.

When using the payment card to pay for a transaction, the user associated with the payment card may provide a payment on behalf of another user, such as in a split transaction where the user pays for one or more items for the user and one or more other users. At other times, the user may want to provide or request a payment to another nearby user, such as to transfer money, settle a debit/credit, or the like. Transaction processing may be performed through a mobile application of the online transaction processor. In order to reduce the required inputs and perform faster data input and processing (e.g., by requiring less application navigations, inputs, and data processing), the user may provide their payment card having the machine-readable code for capture by the device(s) of the other user(s). This code may previously be dynamically linked to the first user's digital account with the online transaction processor. Thereafter, when the other user(s) capture the code through a camera of their device(s) and the corresponding mobile application, the first user's account identifier or other data may be automatically loaded for use by one or more operations and/or interfaces within the mobile application(s). This allows for account-to-account payments and transfers to be facilitated using the different accounts on the peer-to-peer payment and social networking network of the online transaction processor.

For example, a user may wish to process a purchase of the items via a digital account and/or payment card that provides values, credit, or other funds to the user through an online transaction processor and/or electronic card network. Selection of one or more items for an in-person transaction at a physical merchant location or via an online marketplace or other digital platform may require a payment instrument from the user for electronic transaction processing. A user may pay for one or more transactions using a digital wallet or other account with an online service provider or other transaction processor (e.g., PayPal®), as well as the payment card (e.g., through proffering the physical card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions after identity confirmation. However, in other embodiments, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

In order to pay for the transaction (e.g., a transfer or payment to another user, merchant, or other entity), the user may provide the payment card or funding source information or may login to an account with the service provider through authentication information and process the transaction using the account. A payment may then be issued to the other party to the transaction and transaction information may be stored with the digital wallet or account. In this regard, a digital token or other data may authorize and/or authenticate the user for their digital wallet use and/or a payment instrument in the digital wallet, which may be transmitted to another party (e.g., the merchant) for payment processing. In some embodiments, the data may be stored to one or more storage mediums on the payment card, such as a magnetic stripe or an EMV chip. For example, a POS device and/or card reader may be used to read the card data from a merchant device at a merchant location. This may allow for single user payments through a payment account and/or digital wallet, as well as credit available to the payment card and/or digital account. In some embodiments, the account and/or digital wallet may be linked to the user's device or application and a one-touch checkout process may be authorized by the user, where selection of the account or other data may automatically initiate the process to purchase the item using the account and/or digital wallet.

When initially setting up the payment card, a user requesting and establishing the payment card may establish a credit limit, debit source (e.g., bank account or financial account), or other available funding including digital assets. Thereafter, a physical card may be issued to the user that includes different data shown or encoded on the card through different images and designs on the card, as well as data embedded to non-transitory memories on the card (e.g., magnetic stripe, EMV chip, etc.). However, digital cards as a representation of the payment card may also be issued, such as one or more still or animated images and the like, may be issued to the user. The representation of the card may include a machine-readable code, such as a QR code on at least one surface of the card, such as a top and/or bottom of the card. The QR code may form at least a portion of the surface and may include the entire surface. Additionally, where different components and/or data is also shown on the same surface, those components or data may also form a portion of the QR code.

Thereafter, the user may scan or image the QR code using an application, such as a mobile application associated with the online transaction processor. When initially imaging the QR code, the user may enter a registration process or operation within the mobile application for the payment card and/or QR code, or the process may be automatically opened when the QR code is first scanned. When the payment card is first opened and the QR code has not yet been linked to an account and/or registered, the user registering the payment card and/or QR code may utilize this registration process to associate the payment card and/or QR code with the user's digital account with the online transaction processor. This may allow for the digital account of the user that allows the user to send and receive funds through the mobile application and peer-to-peer platform to be linked to the QR code. When linking the QR code to the user's digital account, the QR code may be linked to encoded data within the payment card's QR code so that when the QR code is read within the mobile application of the online transaction processor, the user's digital account identifier or other information may be retrieved and provided to an operation and/or populated on an interface of the mobile application for other users. Thus, the user may determine what data to link to the QR dynamically so that different data may be retrieved and loaded to the mobile application of different users' devices. However, in other embodiments, the user may utilize the mobile application and/or a website to associate the payment card and/or QR code with the digital account of the user.

Further, the registration process may allow the user to dynamically link and change other data that is associated with the QR code. For example, the QR code may include one or more identifiers, codes, or executable processes encoded to the QR code, which, when read by a device's camera and/or application, causes other data to be loaded to other devices utilizing the mobile application of the online transaction processor. For example, the user may change or determine to dynamically link different data to the QR code. This may include only loading the account identifier or account information to the mobile application on other users' devices in order to provide more privacy and/or prevent fraud. However, the user may also choose that additional account information (e.g., account name, personal name, picture or user image, address, phone number, email address, etc.), transaction information for a recent transaction (e.g., the last processed transaction), message capabilities between the users, and/or a maximum account sending/receiving limit may also be loaded within the other users' devices.

Further, the loading of other data when imaging or scanning the QR code by other users' devices, additional contextual data may be used to dynamically determine what data to present. For example, a social graph, social connection, or contact list may be required to link the first user and a second user imaging the first user's QR code on their payment card. Co-location between the users, such as being within a proximity at a certain time, may similarly be required. The link between the first and second users may also be established through previous communication links, social networking connections, transaction histories, and the like. In various embodiments, the user may also change the underlying data linked to the QR code, for example, by utilizing the online transaction processor and/or mobile application to change preferences or other data linked to the QR code. In order to change the linked data, the user may also be required to perform an authentication in order to prevent fraud or changes to the QR code's link data without authorization.

Thereafter, when the QR code of the first user's payment card is imaged or scanned by another user's device (e.g., using the mobile application of the online transaction processor), the data linked to the QR code with the online transaction processor may be loaded to the mobile application on the second user's device automatically. For example, the second user's device may transmit the image or data decoded from the QR code to the online transaction processor, which may fetch the linked data using one or more database table lookups. In various embodiments, the online transaction processor or the second user's device may perform the decoding of the data encoded to the QR code in order to perform the database search operations. Once the linked data is determined, such as an account identifier for the first user's account and corresponding profile on the peer-to-peer payment platform of the online payment provider, the data may be loaded to one or more operations of the mobile application on the second user's device. This may facilitate automatic searching, locating, and/or present the first user's account and/or profile without requiring the second user to enter an identifier, perform a search, or otherwise provide input. Prior to loading the account data and any other data linked to the QR code in the mobile application of the second user's device, the mobile application may require an authentication or other validation of identity, for example, to reduce fraud where the second user's device may become compromised. Further, after scanning the QR code, the first user and/or the second user may be automatically added to contact lists of each respective user.

Thereafter, the second user's device may perform one or more application programming interface (API) calls to communicate with one or more APIs of the online transaction processor and retrieve the linked data to the QR code. Thereafter, the returned data may be loaded to the mobile application of the second user's device via one or more APIs and API calls from the online transaction processor. Once the data is loaded to the second user's mobile application, the second user may request a payment from the first user or may provide a payment to the first user, for example, using one or more interfaces that allow entry of an amount, message, or send/receive request. Thereafter, a transfer or payment exchange may be facilitated using balances and/or financial instruments of the two users' accounts and the online transaction processor. Balance adjustments may then be provided to each users' account, such as by increasing a balance of one user's account through a deposit and withdrawing the corresponding amount from the other user's account. In order to avoid fraud, the first user may be required to provide an authentication prior to providing any payment requested by the second user. Additionally, a message or social networking post may be provided within a peer-to-peer payment and social networking platform associated with the mobile application.

Further, the first and/or second users may wish to split a transaction between multiple users, such as the first user and one or more additional users. The second user may, after scanning the QR code of the first user's payment card, further scan a QR code on a third user's payment card, as well as any further users. This may allow the second user's mobile application to load multiple account identifiers and other account information to one or more interfaces so that a split transaction between multiple users may be processed. Additionally, the second user may also scan or image another QR code on a different object, such as a paper or digital receipt, that include transaction data that may be loaded to the second user's mobile application. The transaction data may be loaded through imaging the receipt's QR code based on data encoded to the receipt's QR code or linked with the online transaction processor to the receipt's QR code. Further, the transaction data may include itemized transaction information for items in the transaction so that different items and other costs or data may be assigned to particular users. Thus, itemized transaction data may also be displayed in the interface for the mobile application of the second user's device when capturing the receipt's QR code.

In various embodiments, when loading data to the second user's device, the online transaction processor and/or mobile application may utilize additional data determined at the time of the capture of the QR code for the first user's payment card. For example, the additional data may include a location of capture, time of capture, other nearby users, past transactions of the two users, activity or social networking posts of the two users, nearby merchant, or other data. The mobile application may present a preloaded message, graphical image or object (e.g., an emoji or image), or other information that may be contextually related to the additional data. For example, a pizza emoji may be presented to the second user in a message field so that a message indicating a purchase of pizza may be automatically provided to the second user for transmission to the first user with the payment request. Further, a transaction total or predicted payment request amount may also be predictively loaded to the second user's mobile application.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first computing device 110, a payment card 120, a second computing device 130, and a transaction processor 140 in communication over a network 160. First computing device 110 may be used to capture an image of a machine-readable code, such as a QR code, on a surface of payment card 120 that is associated with a user of second computing device 130. The machine-readable code of payment card 120 may be used to load account data to one or more interfaces of first computing device 110 automatically so that an account identifier does not need to be searched and a user profile located. Thereafter, first computing device 110 may process a payment request to send or receive funds with second computing device 130, which may be facilitated through digital accounts and processing operations of transaction processor 140.

First computing device 110, a second computing device 130, and a transaction processor 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

First computing device 110 may be implemented using any appropriate hardware and software configured for wired and/or wireless communication with payment card 120, second computing device 130, and/or transaction processor 140 for processing payments and transfers with a user of second computing device 130, for example, by imaging a machine-readable code from or on payment card 120. First computing device 110 may correspond to an individual user, consumer, or merchant that utilizes a peer-to-peer payment network and platform provided by transaction processor 130 to process those payments with second computing device 130. In various embodiments, first computing device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

First computing device 110 of FIG. 1 contains a first payment application 112, other applications 114, a database 116, and a network interface component 118. First payment application 112 and other applications 114 may correspond to executable processes, procedures, and/or applications with associated hardware. In other embodiments, first computing device 110 may include additional or different software as required.

First payment application 112 may correspond to one or more processes to execute modules and associated devices of first computing device 110 to provide a convenient interface to permit a user for first computing device 110 to enter, view, and/or process items the user wishes to purchase in a transaction, as well as perform peer-to-peer payments and transfers on a payment platform provided by transaction processor 140. In this regard, first payment application 112 may correspond to specialized hardware and/or software utilized by first computing device 110 that may provide transaction processing for the items, such as through a user interface enabling the user to enter and/or view the items that the user associated with first computing device 110 wishes to purchase. First payment application 112 may also be used by the first user to provide payments and transfers to a second user associated with second computing device 130. For example, first payment application 112 may utilize user financial information, such as credit card data, bank account data, or other funding source data, as a payment instrument when providing payment information. Additionally, first payment application 112 may utilize a digital wallet associated with an account with a payment provider as the payment instrument, for example, through accessing a digital wallet or account of a user through entry of authentication credentials and/or by providing a data token that allows for processing using the account.

First payment application 112 may also be used to receive a receipt or other information based on transaction processing. In various embodiments, first payment application 112 may correspond to a general browser application configured to retrieve, present, and communicate information over the Internet (e.g., utilize resources on the World Wide Web) or a private network. For example, first payment application 112 may provide a web browser, which may send and receive information over network 160, including retrieving website information, presenting the website information to the user, and/or communicating information to the website, including payment information for the transaction. However, in other embodiments, first payment application 112 may include a dedicated application of transaction processor 140 or other entity (e.g., a merchant), which may be configured to assist in processing transactions electronically, such as a peer-to-peer payment application associated with a peer-to-peer payment and social network platform provided by transaction processor 140.

First payment application 112 may further enable the first user associated with first computing device 110 to capture an image of or otherwise scan a machine-readable code on payment card 120 and load an account identifier or other account information for a digital account of the second user associated with payment card 120 and second computing device 130. In various embodiments, first payment application 112 may utilize a camera of first computing device 110 to capture a code on payment card 120 that may be encoded with data or used to retrieve linked data. Once the code is captured, first payment application 112 may communicate with transaction processor 140 to determine the data dynamically linked to the code, such as the account identifier and any additional data. Thereafter, first payment application 112 may display or otherwise present (e.g., based on the data provided by transaction processor 140) an application interface associated with a peer-to-peer payment or transfer between the first user's account and the second user's account. The interface may include an option to enter an amount, send or request the amount, provide a message or graphical object, or otherwise converse and social network with the second user and/or second computing device 130. Using the loaded account identifier and other information, first payment application 112 may then be used to process a payment to or request a payment from the second user's account and/or second computing device 130.

In various embodiments, first computing device 110 includes other applications 114 as may be desired in particular embodiments to provide features to first computing device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. Other applications 114 may also include other location detection applications, which may be used to determine a location for first computing device 110, such as a mapping application. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of first computing device 110, such as display components capable of displaying information to users and other output components, including speakers.

First computing device 110 may further include database 116 which may include, for example, identifiers such as operating system registry entries, cookies associated with first payment application 112 and/or other applications 114, identifiers associated with hardware of first computing device 110, or other appropriate identifiers. Identifiers in database 116 may be used by a payment/service provider to associate first computing device 110 with a particular account maintained by the payment/service provider. Database 116 may also further store received transaction data, as well as processed transaction data. In various embodiments, a machine-readable code captured of payment card 120, as well as decoded data from the code and/or receive account identifiers and other linked data to the machine-readable code, may be stored by database 116.

First computing device 110 includes at least one network interface component 118 adapted to communicate with second computing device 130 and/or transaction processor 140 over network 160. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment card 120 may correspond to a physical payment card and/or digital representation of a payment card that may be used to store card data corresponding to financial data used to process transactions. In some embodiments, payment card 120 may correspond to a standard sized card (e.g., ~85.×54 mm (3.37×2.125 in)) card having rounded corners) that include one or more storage mechanisms (e.g., magnetic stripe, EMV chip, NFC chip and/or antenna, or the like). Payment card 120 may also correspond to a key fob or other device that similarly may include a storage mechanism and may store data. In some embodiments, payment card 120 may be virtual and may be stored to another device, such as second computing device 130.

Payment card 120 may include a QR code 122 or be associated with QR code 122, which may link to backend data that allows accessing of a digital account based on encoded data in QR code 122. In other embodiments, any suitable machine-readable code may be used and is not limited to only a QR code. The encoded data may be dynamically linked to different backend data so that when QR code 122 is read, different actions, operations, and/or data may be accessed and/or utilized, such as loading of an account identifier and/or payment/transfer screen to an account linked to QR code 122. QR code 122 may correspond to a surface of payment card 122 or may otherwise be represented on or with payment card 120, including physical or digital representations of payment card 120. Additionally, different machine-readable codes may also be used in place of QR code 122, such as a barcode, graphical object, and the like, which may be visible or made invisible through infrared or ultraviolet imaging. Payment card 120 may also be configured to store card data corresponding to a card account, value balance (e.g., account balance for a debit card), credit balance, or the like as embedded data 124. In other embodiments, embedded data 124 may be stored to other storage mediums, such as a non-transitory memory for an NFC or RFID chip and/or device. Identifier 126 may also be provided on or with payment card 120, which may correspond to a card and/or account identifier. For example, identifier 126 may correspond to a 16 digit or other series of digits and/or alphanumeric codes, that allows for specific identification of an account and use of payment card 120 to process transactions. Identifier 126 may include multiple identifiers, including a user name, an expiration date, and/or a CCV number.

Second computing device 130 may be implemented using any appropriate hardware and software configured for wired and/or wireless communication with first computing device 110, payment card 120, and/or transaction processor 140 for establishing and processing a transaction based on one or more of payment card 120 and/or second computing device 130. Second computing device 130 may correspond to a second user that receives a payment or transfer from a first user associated with first computing device 110 based on first computing device 110 scanning, imaging, or otherwise capturing QR code 122 on payment card 120. In various embodiments, second computing device 130 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Second computing device 130 of FIG. 1 contains a second payment application 132, other applications 134, a database 136, and a network interface component 138. Second payment application 132 and other applications 134 may correspond to executable processes, procedures, and/or applications with associated hardware. In other embodiments, second computing device 130 may include additional or different software as required.

Second payment application 132 may correspond to one or more processes to execute software modules and associated components of first computing device 110 to process electronic transactions at a physical merchant location or over a network with an online marketplace by a second user associated with second computing device 130, as well as sending and receiving payments with a first user associated with first computing device 110. In this regard, second payment application 132 may correspond to specialized hardware and/or software utilized by the second user of second computing device 130 to establish a transaction, for example, by requesting purchase of certain items at a physical location or accessing a website or an interface of a marketplace or other sales platform to browse item data for items for sale. At a physical merchant location, second payment application 132 may designate the items for purchase or the user may bring items to a checkout, where payment card 120 and/or second computing device 130 may provide card data, account data, or other financial data to process the transaction. With digital transactions, second payment application 132 may designate the items for purchase through the online marketplace for the merchant and provide the card data, account login and/or account data, financial data, or a digital token used to pay for the transaction data and perform transaction processing. For example, the transaction data may be received via a checkout interface dynamically rendered through second payment application 132. Second payment application 132 may further provide one or more user interfaces to send and receive payments or transfers with the first user associated with first computing device 110, for example, in response to first computing device 110 capturing QR code 122 on payment card 120 and transmitting a payment request to second payment application 132 via transaction processor 140.

In various embodiments, second payment application 132 may receive the payment request from first computing device 110, which may be received through a digital payment platform such as a peer-to-peer payment and social networking platform provided by transaction processor 140. Second payment application 132 may display information for the payment request, such as the amount, whether the amount is sent or request, a message or social networking interaction, an identifier or account name for the first user, and/or other account information such as a user profile. Thus, an interface of second payment application 132 may include interface data and interface elements that allow for interaction with the payment request and/or viewing additional transaction data for a transaction associated with the payment request. During transaction processing, such as to provide a payment or transfer from the second user's digital account on the platform to the first user's digital account, second payment application 132 may be utilized to select payment instrument(s) for use in providing payment for a purchase, transfer, or other financial process.

As discussed herein, second payment application 132 may utilize user financial information, such as credit/debit card data (including payment card 120's corresponding data such as identifier 126), bank account data, or other funding source data, as a payment instrument when providing payment information. Additionally, second payment application 132 may utilize a digital wallet associated with an account with a payment provider as the payment instrument, for example, through accessing a digital wallet or account of a user through entry of authentication credentials and/or by providing a data token that allows for processing using the account. Second payment application 132 may also be used to receive a receipt or other information based on transaction processing. In various embodiments, second payment application 132 may correspond to a general browser application configured to retrieve, present, and communicate information over the Internet (e.g., utilize resources on the World Wide Web) or a private network. For example, second payment application 132 may provide a web browser, which may send and receive information over network 160, including retrieving website information, presenting the website information to the user, and/or communicating information to the website, including payment information for the transaction. However, in other embodiments, second payment application 132 may include a dedicated application of transaction processor 140 or other entity (e.g., a merchant), which may be configured to assist in processing transactions electronically.

In various embodiments, second computing device 130 includes other applications 134 as may be desired in particular embodiments to provide features to second computing device 130. For example, other applications 134 may include security applications for implementing client-side security features, programmatic client applications for interfacing with appropriate application programming interfaces (APIs) over network 160, or other types of applications. Other applications 134 may also include email, texting, voice and IM applications that allow a user to send and receive emails, calls, texts, and other notifications through network 160. Other applications 134 may also include other location detection applications, which may be used to determine a location for second computing device 130, such as a mapping application. Other applications 134 may include device interface applications and other display modules that may receive input from the user and/or output information to the user. For example, other applications 134 may contain software programs, executable by a processor, including a graphical user interface (GUI) configured to provide an interface to the user. Other applications 134 may therefore use components of second computing device 130, such as display components capable of displaying information to users and other output components, including speakers.

Second computing device 130 may further include database 136 which may include, for example, identifiers such as operating system registry entries, cookies associated with second payment application 132 and/or other applications 134, identifiers associated with hardware of second computing device 130, or other appropriate identifiers. Identifiers in database 136 may be used by a payment/service provider to associate second computing device 130 with a particular account maintained by the payment/service provider. Database 136 may also further store received transaction data for processed transactions, as well as card data, account data, or other financial data used to process such transactions and/or respond to payment request resulting from capturing QR code 122 on payment card 120.

Second computing device 130 includes at least one network interface component 138 adapted to communicate with first computing device 110 and/or transaction processor 140 over network 160. In various embodiments, network interface component 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor 140 may be maintained, for example, by an online service provider, which may provide processes to provide account services and process payments, as well as peer-to-peer or other payment and social networking services associated with an online digital platform and mobile applications. In this regard, transaction processor 140 includes one or more processing applications which may be configured to interact with first computing device 110, second computing device 130, and/or another device/server to facilitate communications and transactions between users. Transaction processor 140 may be maintained by or include another type of platform or service provider, for example, a transaction processor such as PAYPAL®, Inc. of San Jose, CA, USA. Although first computing device 110 and transaction processor 140 are discussed as separate devices and servers, in some embodiments, one or more of the described processes of may instead be provided by the other device or server, or the same device or server.

Transaction processor 140 of FIG. 1 includes a transaction processing application 150, other applications 142, a database 144, and a network interface component 148. Transaction processing application 150, and other applications 142 may correspond to executable processes, procedures, and/or applications with associated hardware. In other embodiments, transaction processor 140 may include additional or different modules having specialized hardware and/or software as required.

Transaction processing application 150 may correspond to one or more processes to execute modules and associated specialized hardware of transaction processor 140 to process a transaction for item(s) with first computing device 110, payment card 120, and/or second computing device 130, which may be based on one or more transactions processed using payments provided by payment card 120 and/or second computing device 130. In this regard, transaction processing application 150 may correspond to specialized hardware and/or software used by a user associated with first computing device 110 and/or second computing device to establish an account with transaction processing application

150 by providing personal and/or financial information to transaction processor 140 and selecting authentication credentials. In various embodiments, the financial information may include payment instrument information, such as account/card numbers and information. The account may be used to purchase items and/or transfer funds, for example, through peer-to-peer payment operations 152 that allow for a peer-to-peer network and/or social networking environment that allows for interactions between different users, merchants, or other entities. The payment account may be accessed and/or used through a browser application and/or dedicated payment application executed by first computing device 110 and/or second computing device 130, such as first payment application 112 and/or second payment application 132. However, in other embodiments, a payment account may be generated by another online transaction processor or service provider and linked with transaction processor 140. Additionally, transaction processing application 150 may be used to create, establish, and/or link payment card 120 to the account of a user so that QR code 122 may be linked to the account dynamically through encoded data in QR code 122. Transaction processing application 150 may process a payment and may provide a transaction history for transaction authorization, approval, or denial, Transaction processing application 150 may correspond to a product of service provider server 120 that may be utilized by end users, such as to perform electronic payments, transfers, and the like using one or more accounts and/or financial instruments. Transaction processing application 150 may also include or utilize different processors, engines, or models as required for an authentication, account setup and maintenance, electronic transaction processing, deposit and/or withdrawal, dispute resolution, and the like, for example, through peer-to-peer payment operations 152. Transaction processing application 150 may include one or more APIs utilized to communicate with first computing device 110 and/or second computing device 130 to allow for retrieving stored data linked to QR code 122 of payment card 120. For example, peer-to-peer operations 152 may receive requests for data linked to QR code 122 when first computing device 110 captures, scans, or images QR code 122 (e.g., through one or more API calls to APIs of transaction processing application 150 that interfaces with APIs of computing devices). Peer-to-peer payment operations may respond with the linked data, such as an account identifier, data display preferences, transaction information, or other information linked to QR code 120. In various embodiments, peer-to-peer payment operations may also be used with receipts having QR codes that allow for sharing of application data automatically through applications.

In various embodiments, transaction processor 140 includes other applications 142 as may be desired in particular embodiments to provide features to transaction processor 140. For example, other applications 142 may include security applications for implementing server-side security features, programmatic client applications for interfacing with appropriate application programming interfaces (APIs) over network 160, or other types of applications. Other applications 142 may contain software programs, executable by a processor, including a graphical user interface (GUI), configured to provide an interface to the user when accessing transaction processor 140, where the user or other users may interact with the GUI to more easily view and communicate information. In various embodiments, other applications 142 may include additional connection and/or communication applications, which may be utilized to communicate information to over network 160.

Additionally, transaction processor 140 includes database 144. Database 144 may store various identifiers associated with first computing device 110. Database 144 may also store account data, including payment instruments and authentication credentials, as well as transaction processing histories and data for processed transactions. Database 144 may store received data associated with a user for use with payment card 120, such as registration of payment card 120 and linking of an account identifier or other account information with QR code 122. This may include different account information display preferences (e.g., display of certain account information), as well as messaging and/or payment request preferences and limitations.

In various embodiments, transaction processor 140 includes at least one network interface component 148 adapted to communicate first computing device 110, second computing device 130, and/or another device/server for a merchant over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
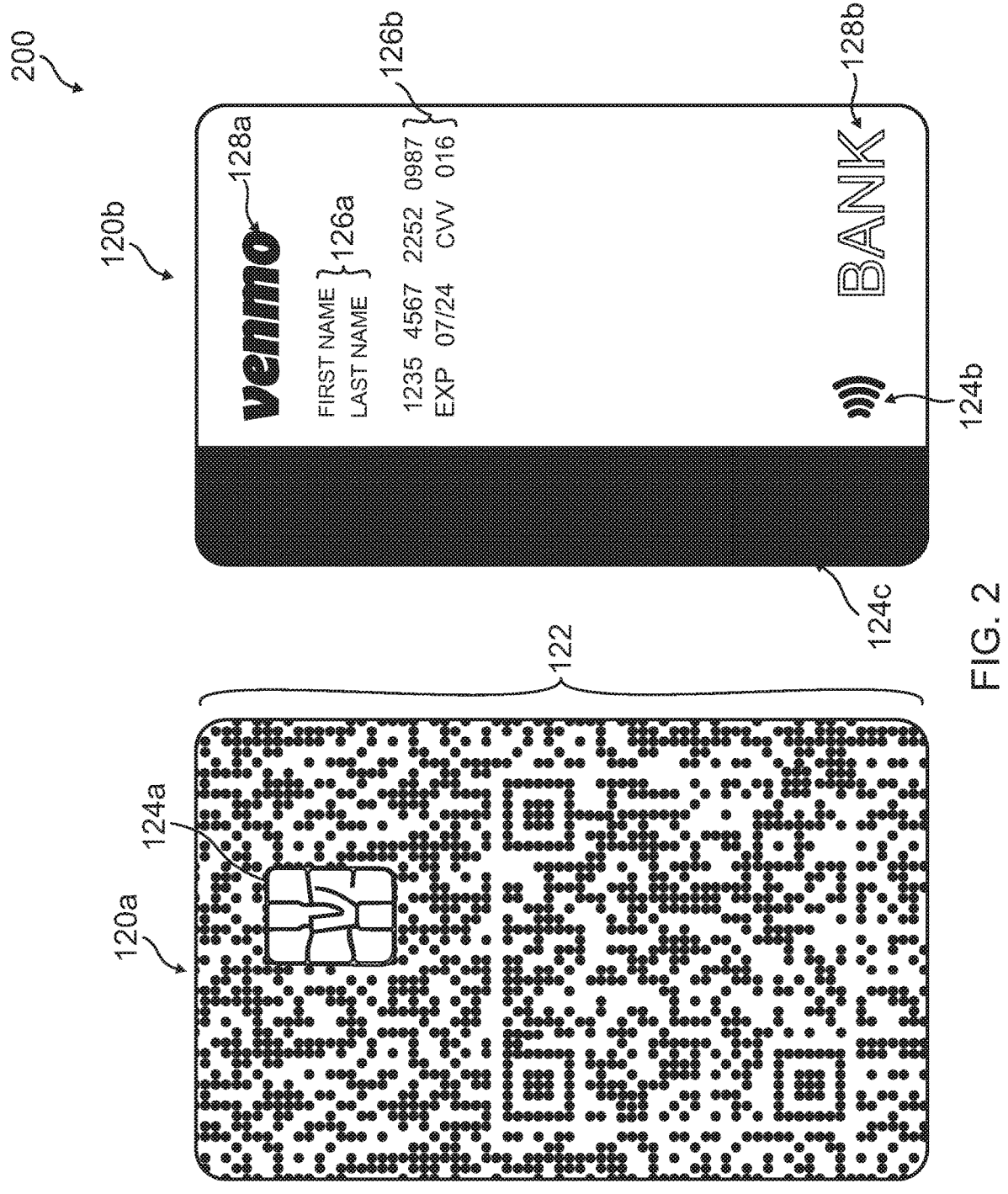
FIG. 2 is exemplary payment card surfaces used to dynamically link backend data with an online service provider, according to an embodiment.

FIG. 2 shows exemplary payment card surfaces 200 used to dynamically link backend data with an online service provider, according to an embodiment. Payment card surfaces 200 of FIG. 2 display the different physical surfaces of payment card 120 discussed in reference to system 100 of FIG. 1.

Payment card surfaces 200 show a first surface 120*a* and a second surface 120*b* of payment card 120, such as a front and back surface of a flat card that may have information and/or storage mediums embedded on or between the two surfaces. For example, on a first surface 120*a*, QR code 122 is shown embedded, stylized, or otherwise displaced onto the physical material surface of payment card 120. On first surface 120*a*, QR code 120 may constitute the entire surface of first surface 120*a*, including to the borders of first surface 120*a*. In such embodiments, first surface 120*a* may also include embedded data 124, such as an EMV chip 124*a*. Thus, EMV chip 124*a* may constitute a portion of QR code 122 or may be ignored or not utilized when decoding encoded data from QR code 122. However, in other embodiments, QR code 122 may be a smaller portion of first surface 120*a*, such as a smaller area that does not encompass EMV chip 124*a*. Further, QR code may also correspond to other types of machine-readable codes and may also correspond to a plurality of the same or different machine-readable codes. Thus, image imaging, scanning, or otherwise capturing QR code 122 by another device, data may be decoded from QR code 122 by the other device or an online transaction processor, and linked data may be retrieved using a database table lookup.

On second surface 120*b*, additional data may be displayed and/or embedded for use with payment card 120. For example, on second surface 120*b*, additional embedded data may be provided and displayed on or within payment card 120. For example, an RFID or NFC chip 124*b* may be designated as embedded in payment card 120 using second surface 120*b* so that a user is aware that such short-range communications (e.g., NFC taps) may be used with payment card 120. Further, a magnetic stripe 124*c* may be designated or shown as a strip across second surface 120*b*. One or more identifiers 126 may also be shown on second surface 120*b*. A name identifier 126*a* may be shown to designate a user that payment card is assigned to for use in authenticating the user. Payment card identifiers 126*b* are also shown with a payment card number, expiration date, and CVV value. Additionally, one or more organization, bank, or company names may be provided on the card to identify a source of payment card 120. For example, an organizational name 128*a* of the online transaction processor may be shown on second surface 120*b*. Additionally, a card processor name 128*b* may also be shown on second surface 120*b*.

Figure 3:
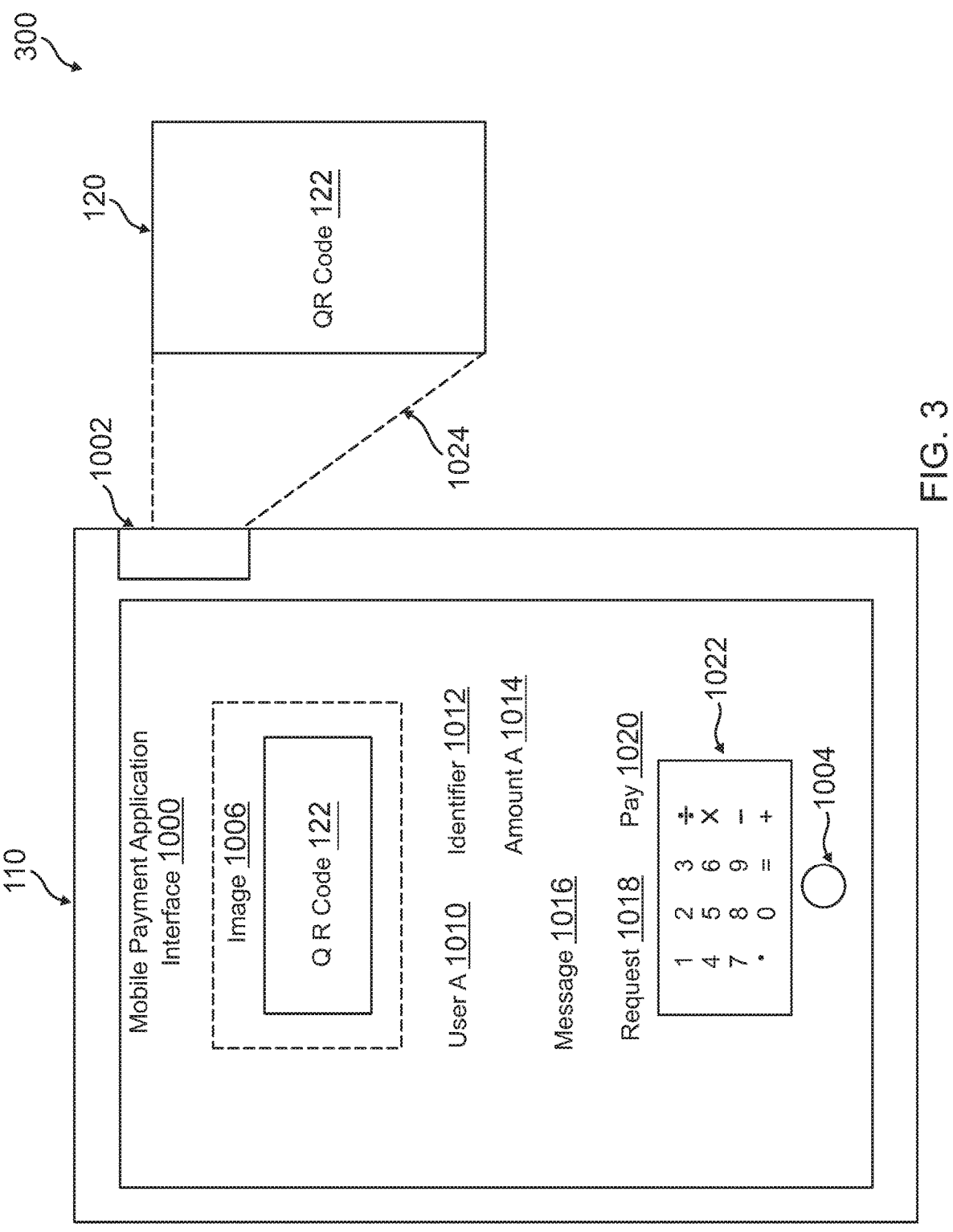
FIG. 3 is an exemplary environment with a device application interface showing loaded data based on scanning a payment card's machine-readable code, according to an embodiment.

FIG. 3 is an exemplary environment 300 with a device application interface showing loaded data based on scanning a payment card's machine-readable code, according to an embodiment. Environment 300 of FIG. 3 includes first computing device 110 and payment card 120 discussed in reference to system 100 of FIG. 1. In this regard, first computing device 110 displays a dynamically rendered and displayed interface for an application, such as first payment application 112, that may display account data within an application interface in response to capturing a machine-readable code on payment card 120.

Environment 300 therefore includes first computing device 110 capturing QR code 122 on payment card 120, which may be dynamically linked to backend data associated with a user account for a user in possession of or utilizing payment card 120 for payment purposes. First computing device 110 may include a camera 1002 that may capture an image 1006 through imaging 1024. Image 1006 may be displayed in a mobile payment application interface 1000, such as an interface displayed by first payment application 112. For example, a user may utilize an image capture controller 1004, such as a button or touch screen interface element, that allows for capturing of image 1006 through imaging 1024 performed by camera 1002. Image 1006 is shown with QR code 122 displayed in image 1006 so that the user utilizing first computing device 110 may properly see what is being captured in imaging 1024 and perform proper capturing of QR code 122.

Thereafter, QR code 122 may be decoded to determine the encoded data, such as a table identifier that may be utilized for a database table lookup and determination of data linked to QR code 122, such as an account identifier and other account information that may be loaded and displayed through mobile payment application interface 1000. First computing device 110 may perform the decoding, or image 1006 may be transmitted to a backend server, such as transaction processor 140 in system 100, for the decoding. Mobile payment application interface 1000 may then load and display the corresponding account information, such as a user A 1010 for the account and an identifier 1012 (e.g., a phone number, email address, application identifier, username, photo or image of the user, or the like).

Using mobile payment application interface, a user of first computing device 110 may enter an amount A 1014 for payment or transfer between the user of first computing device 110 and the user associated with payment card 120.

The user of first computing device 110 may further enter a message 1016 for transmission to the device associated with the account linked to QR code 122. Entry of amount A 1014 and/or message 1016 may be performed using a keypad 1022 and/or other entry process, such as another input mechanism of first computing device 110, or otherwise connected to first computing device 110. Thereafter, the user may select whether amount A 1014 is requested or paid to user A 1010 using a request option 1018 or a pay option 1020. Selection of the interface element may then cause the payment or transfer request to be processed.

FIG. 4 is a flowchart 400 of an exemplary process for dynamically linking machine-readable codes to digital accounts for loading of application data, according to an embodiment. Note that one or more steps, processes, and methods described herein of flowchart 400 may be omitted, performed in a different sequence, or combined as desired or appropriate.

At step 402 of flowchart 400, a registration scan of a machine-readable code on a payment card by a first device is received. The registration scan may occur in order to link an account with the machine-readable code, such as by linking an account identifier and any other account information that may then be loaded to an application and displayed when the machine-readable code is scanned. Thereafter, at step 404, the physical card and machine-readable code is registered to an account associated with the device, such as an account that is logged into and authenticated through an application on the first device. This may be linked by utilizing the encoded data in the machine-readable code to associate the machine-readable code with the account when the machine-readable code is captured and/or decoded.

An account lookup scan of the machine-readable code is received by a second device, at step 406. The account lookup scan may be performed through a mobile payment application on the second device and through a camera or other imaging component of the second device. The account lookup scan may also be initiated through an operation to perform account lookup and loading of account information to perform a payment or transfer with the account linked to the machine-readable code. Thereafter, encoded data in the machine-readable code is determined, at step 408. For example, the machine-readable code may be decoded by the second device and the encoded data may be used to perform an account lookup using an online transaction processor and/or mobile application. However, in other embodiments, the machine-readable code may be decoded by the online transaction processor.

At step 410, the account dynamically associated with the machine-readable code is determined using the encoded data. For example, a database table lookup may be performed using the encoded data to determine the account information linked to the machine-readable code. Once the linked or underlying data is determined, at step 412, account data for the account is loaded to a payment application on the second device. For example, the online transaction processor may cause the data to be loaded, rendered, and/or displayed through the mobile application on the second device. The account information may be displayed in one or more interfaces, such as through a GUI of the second device.

A payment request to the account is then received from the second device, at step 414. The payment request may correspond to sending or receiving an amount of funds or value from an account associated with the second device and to the account linked to the machine-readable code. For example, the payment request may correspond to a payback or transfer for an amount associated with the recently processed transaction using the payment card. However, in other embodiments, the payment request may also be for another payment or transfer that may be facilitated with less user inputs and processing operations within the mobile application. Thereafter, at step 416, the payment request is processed with the account. For example, a fund transfer or payment between the two accounts may be performed and processed using the accounts and funds for one or more of the accounts.

Figure 5:
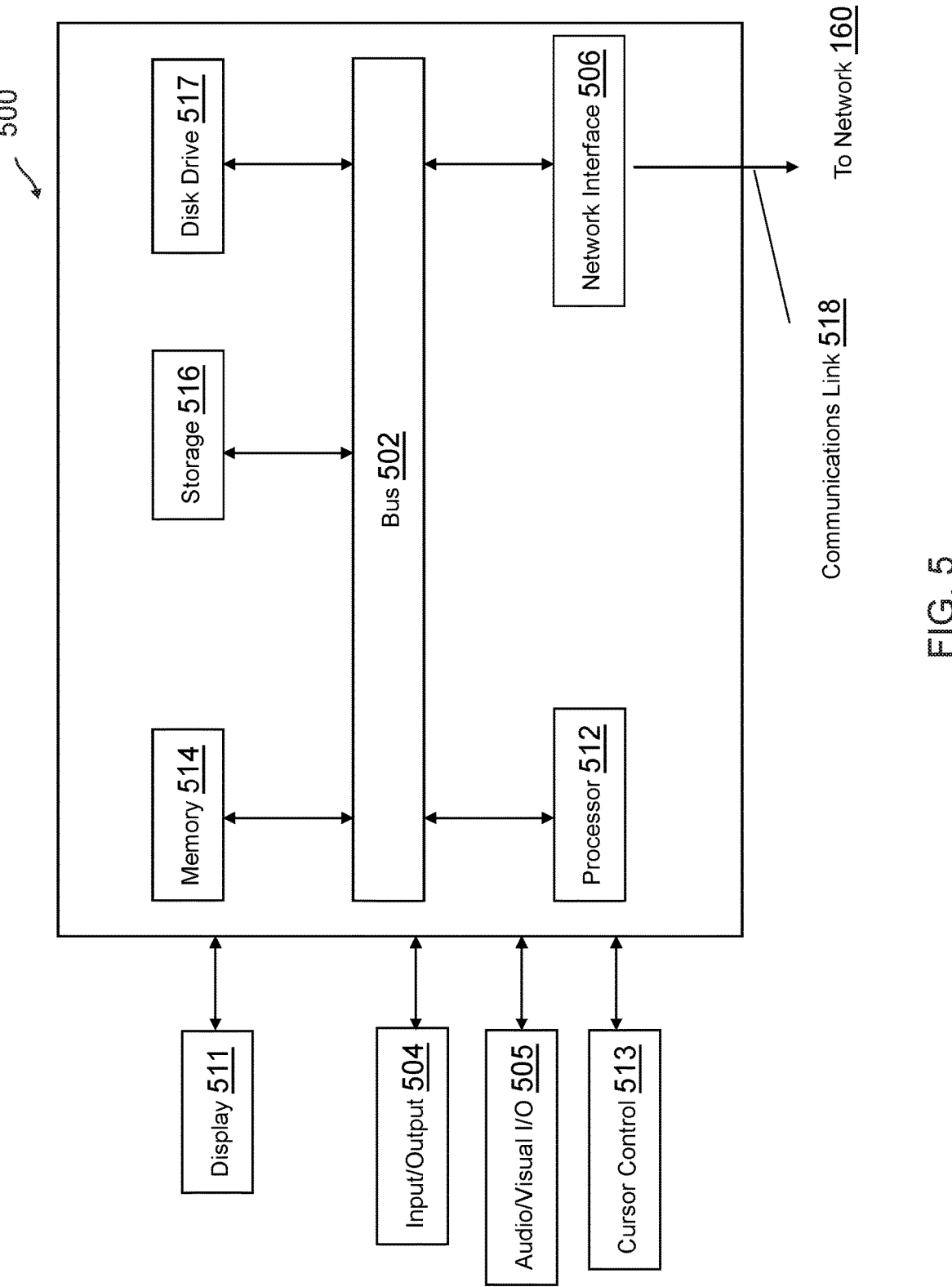
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:

receiving, by an online processor platform from a first mobile device, an image scan of a machine-readable code printed on a physical card;

determining, by the online processor platform, encoded data from the machine-readable code;

decoding an account identifier for a first account from the encoded data, wherein the decoding the account identifier includes executing a database search for data linked to the encoded data, and wherein the encoded data prevents additional data associated with the first account from being automatically displayed with the account identifier when the machine-readable code on the physical card is scanned;

determining a first application interaction for a first mobile application executing on the first mobile device based on contextual data associated with the image scan of the machine-readable code, wherein the first application interaction enables the first mobile application to interact with a second mobile application on a second mobile device associated with the first account;

displaying, via a first mobile application executing on the first mobile device, a first interface including a first interface element that enables the first application interaction to be performed in the first mobile application;

presenting, by the online processor platform via the first mobile application, information in a field of a message displayed via the first interface, wherein the information is associated with the contextual data and is automatically loaded in the field based on the first application interaction;

preventing, based on the encoded data, the additional data from being displayed in the first mobile application with the account identifier;

detecting, by the online processor platform, the first application interaction being initiated with the second mobile application via the first interface element;

transmitting, by the online processor platform, data associated with the first application interaction and the message to the second mobile device;

detecting, by the online processor platform, that the second mobile device has initiated a second application interaction with the first mobile device via the second mobile application on the second mobile device; and displaying, by the online processor platform via the first mobile application on the first mobile device, a second interface having an application operation that processes the second application interaction using the account data, wherein the application operation enables the first mobile device to process a payment for the second application interaction to the first account using a second account associated with the first mobile device.

2. The method of claim 1, further comprising:

receiving, by the online processor platform, an input for the payment from the first mobile device via the first mobile application, wherein the input includes at least an amount of the payment and a digital message for the second application interaction.

3. The method of claim 1, further comprising:

displaying, by the online processor platform on the first mobile device based on processing the payment to the first account from the second account, a third interface comprising a result of the processing the payment, wherein the third interface transitions from the second interface after the processing; and providing access to at least a portion of the additional data via the third interface.

4. The method of claim 1, further comprising:

providing a post on a peer-to-peer payment platform accessible via the first mobile application, wherein the post is provided in association with at least one of the first account or the second account.

5. The method of claim 1, further comprising:

determining a timestamp associated with the image scan; and displaying, in the second interface of the first mobile application, content associated with the timestamp and the payment.

6. The method of claim 5, wherein the content comprises one of a social networking post or a group payment processed by the first account that requests the payment for a split portion of the group payment from the second account.

7. The method of claim 1, further comprising:

receiving an image of a physical receipt from the first mobile device; and loading receipt data for the physical receipt to the second interface, wherein the payment comprises at least a portion of a total in the receipt data.

8. The method of claim 1, wherein the displaying the second interface includes displaying an identification of a user associated with the physical card in the second interface.

9. A system comprising:

a non-transitory memory; and one or more hardware processors coupled to the non-transitory memory and configured to execute instructions to cause the system to:

receive, by an online processor platform associated with the system from a first mobile device, an image scan of a machine-readable code printed on a physical card;

determine, by the online processor platform, encoded data from the machine-readable code;

decode, by the online processor platform, an account identifier for a first account from the encoded data, wherein the encoded data prevents additional data associated with the first account from being automatically displayed with the account identifier when the machine-readable code on the physical card is scanned;

determine, by the online processor platform, a first application interaction for a first mobile application executing on the first mobile device initiated based on contextual data associated with the image scan of the machine-readable code, wherein the first application interaction enables the first mobile application to interact with a second mobile application on a second mobile device associated with the first account;

display, by the online processor platform via a first mobile application executing on the first mobile device, a first interface including a first interface element that enables the first application interaction to be performed in the first mobile application;

present, by the online processor platform via the first mobile application, information in a field of a message displayed via the first interface, wherein the information is associated with the contextual data and is automatically loaded in the field based on the first application interaction;

prevent, by the online processor platform based on the encoded data, the additional data associated with the first account from being displayed in the first mobile application with the account identifier;

detect, by the online processor platform, the first application interaction being initiated with the second mobile application via the first interface element;

transmit, by the online processor platform, data associated with the first application interaction and the message to the second mobile device;

detect, by the online processor platform, that the second mobile device has initiated a second application interaction with the first mobile device via the second mobile application on the second mobile device; and display, by the online processor platform in the first mobile application on the first mobile device, a second interface having an application operation that processes the second application interaction using the account data, wherein the application operation enables the first mobile device to process a payment for the second application interaction to the first account using a second account associated with the first mobile device.

10. The system of claim 9, wherein the instructions are further executable to cause the system to:

receive, by the online processor platform, an input for the payment from the first mobile device via the mobile application, wherein the input includes at least an amount of the payment and a digital message for the second application interaction.

11. The system of claim 9, wherein the instructions are further executable to cause the system to:

display, by the online processor platform on the first mobile device based on processing the payment to the first account from the second account, a third interface comprising a result of processing the payment, wherein the third interface transitions from the second interface after processing the payment and reveals at least a portion of the account information.

12. The system of claim 9, wherein the instructions are further executable to cause the system to:

provide a post on a peer-to-peer payment platform accessible via the mobile application, wherein the post is provided in association with at least one of the first account or the second account.

13. The system of claim 9, wherein the instructions are further executable to cause the system to:

determine a timestamp associated with the image scan; and display, in the second interface of the first mobile application, content associated with the timestamp and the payment.

14. The system of claim 13, wherein the content comprises one of a social networking post or a group payment processed by the first account that requests the payment for a split portion of the group payment from the second account.

15. The system of claim 9, wherein the instructions are further executable to cause the system to:

receive an image of a physical receipt from the first mobile device; and load receipt data for the physical receipt to the second interface, wherein the payment comprises at least a portion of a total in the receipt data.

16. The system of claim 9, wherein displaying the second interface includes providing an identification of a user associated with the physical card, and wherein the providing the identification hides the account information from being presented in the second interface.

17. A non-transitory machine-readable medium having stored thereon machine-readable instructions executable to cause a machine to perform operations comprising:

receiving, by an online processor platform from a first mobile device, an image scan of a machine-readable code printed on a physical card;

determining, by the online processor platform, encoded data from the machine- readable code;

decoding an account identifier for a first account from the encoded data, wherein the decoding the account identifier includes executing a database search for data linked to the encoded data, and wherein the encoded data prevents additional data associated with the first account from being automatically displayed with the account identifier when the machine-readable code on the physical card is scanned;

determining a first application interaction for a first mobile application executing on the first mobile device based on contextual data associated with the image scan of the machine-readable code, wherein the first application interaction enables the first mobile application to interact with a second mobile application on a second mobile device associated with the first account;

displaying, via a first mobile application executing on the first mobile device, a first interface including a first interface element that enables the first application interaction to be performed in the first mobile application;

presenting, by the online processor platform via the first mobile application, information in a field of a message displayed via the first interface, wherein the information is associated with the contextual data and is automatically loaded in the field based on the first application interaction;

preventing, based on the encoded data, the additional data from being displayed in the first mobile application with the account identifier;

detecting, by the online processor platform, the first application interaction being initiated with the second mobile application via the first interface element;

transmitting, by the online processor platform, data associated with the first application interaction and the message to the second mobile device;

detecting, by the online processor platform, that the second mobile device has initiated a second application interaction with the first mobile device via the second mobile application on the second mobile device; and displaying, by the online processor platform via the first mobile application on the first mobile device, a second interface having an application operation that processes the second application interaction using the account data, wherein the application operation enables the first mobile device to process a payment for the second application interaction to the first account using a second account associated with the first mobile device.

18. The non-transitory machine-readable medium of claim 17, wherein the operations further comprise:

receiving, by the online processor platform, an input for the payment from the first mobile device via the first mobile application, wherein the input includes at least an amount of the payment and a digital message for the second application interaction.

19. The non-transitory machine-readable medium of claim 17, wherein the operations further comprise:

displaying, by the online processor platform on the first mobile device based on processing the payment to the first account from the second account, a third interface comprising a result of the processing the payment, wherein the third interface transitions from the second interface after the processing; and providing access to at least a portion of the additional data via the third interface.

20. The non-transitory machine-readable medium of claim 17, wherein the operations further comprise:

providing a post on a peer-to-peer payment platform accessible via the first mobile application, wherein the post is provided in association with at least one of the first account or the second account.

* * * * *